US012756250B2

(12) United States Patent
Gong et al.

(10) Patent No.: US 12,756,250 B2
(45) Date of Patent: Oct. 6, 2026

(54) ROTOR FOR A PERMANENT MAGNET ELECTRIC MACHINE

(71) Applicant: GM GLOBAL TECHNOLOGY OPERATIONS LLC, Detroit, MI (US)

(72) Inventors: Cheng Gong, Troy, MI (US); Edward L. Kaiser, Orion, MI (US); Cheongun Han, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 296 days.

(21) Appl. No.: 18/503,217

(22) Filed: Nov. 7, 2023

(65) Prior Publication Data

US 2025/0149939 A1 May 8, 2025

(51) Int. Cl.
*H02K 1/276* (2022.01)
*H02K 7/00* (2006.01)

(52) U.S. Cl.
CPC ............. *H02K 1/276* (2013.01); *H02K 7/006* (2013.01)

(58) Field of Classification Search
CPC ............................... H02K 1/276; H02K 7/006
USPC ............ 310/156.01, 156.51, 156.28, 156.29, 310/156.31
See application file for complete search history.

(56) References Cited

U.S. PATENT DOCUMENTS

2015/0280499 A1* 10/2015 Pandi ................... H02K 1/2766 310/156.53
2021/0296950 A1 9/2021 Baba
2023/0231428 A1* 7/2023 Gong ..................... H02K 15/03 310/156.01

FOREIGN PATENT DOCUMENTS

| | | | | | |
|---|---|---|---|---|---|
| CA | 2990548 | A1 * | 7/2018 | ........... H02K 1/2766 |
| CN | 206135671 | U | 4/2017 | |
| CN | 210007497 | U | 1/2020 | |
| CN | 211655861 | U * | 10/2020 | |
| CN | 115940455 | A * | 4/2023 | |
| DE | 102019110013 | A1 | 10/2019 | |
| DE | 102019212256 | A1 | 2/2021 | |
| EP | 3145057 | A1 | 3/2017 | |
| JP | H05244741 | A * | 9/1993 | ........... H02K 1/2773 |
| JP | 2016111787 | A | 6/2016 | |
| KR | 1020210065411 | A | 4/2021 | |
| WO | WO-2020017262 | A1 * | 1/2020 | ............... H02K 1/27 |
| WO | WO-2023088708 | A1 * | 5/2023 | ............. H02K 15/03 |

* cited by examiner

*Primary Examiner* — Jose A Gonzalez Quinones
(74) *Attorney, Agent, or Firm* — Quinn IP Law

(57) ABSTRACT

A rotor assembly for an electric machine includes first laminates, second laminates; and a rotor shaft, wherein the first laminates and the second laminates are arranged in a stack on the rotor shaft. Each of the first laminates includes a first inner portion and a plurality of first outer portions, wherein the first inner portion and the first outer portions define a plurality of first cavities, wherein the plurality of first outer portions are secured to the first inner portions via a plurality of bridges. Each of the second laminates includes a second inner portion and a plurality of second outer portions. The second inner portion and the plurality of second outer portions define a plurality of second cavities, wherein the second outer portions are secured to the second inner portions via a plurality of second webs and are absent a bridge.

10 Claims, 5 Drawing Sheets

ROTOR FOR A PERMANENT MAGNET ELECTRIC MACHINE

INTRODUCTION

Electric motor/generators including interior permanent magnet (IPM) electric machines may be employed as torque generative devices on vehicles. However, high-speed IPM rotors with retention sleeves generally suffer from lower torque density compared with non-sleeve-wrapped rotors, due to an effective increase in an air gap between a rotor assembly and a stator due to presence of the retention sleeve.

A rotor assembly for an IPM electric machine includes a laminate stack having a plurality of magnetic pole sections that are created by permanent magnets that are inserted into and secured in a plurality of cavities that are formed in the laminate stack. Laminates of the laminate stack have web portions and bridges to provide structural and mechanical integrity in the vicinity of the plurality of cavities. In some embodiments, webs may be removed to reduce leakage flux and compensate for lower torque. However, bridges are kept to maintain lamination integrity, resulting in flux leakage. The thicknesses of bridges and/or webs may be determined by manufacturing capability rather than the centrifugal stress at high speeds.

There may be benefits to having electric machines with increased torque density, increased power density, increased power at high speed, and other performance features that minimize flux leakage, improve thermal management, fit within available package space, and/or reuse part or component designs to minimize engineering effort and design validation.

SUMMARY

The concepts described herein provide a permanent magnet electric machine having a rotor assembly that advantageously reduces flux leakage by removing bridges in at least a portion of the laminates that form the rotor assembly. This may serve to increase torque density and power density compared to similarly constructed electric machines that have bridges in all of the laminates that form the rotor assembly.

An aspect of the disclosure may include a rotor assembly for an electric machine that includes a plurality of first disc-shaped laminates, a plurality of second disc-shaped laminates; a rotor shaft; a wrap; and a plurality of permanent magnets, wherein the plurality of first disc-shaped laminates and the plurality of second disc-shaped laminates are arranged in a stack on the rotor shaft. Each of the plurality of first disc-shaped laminates includes a first inner portion and a plurality of first outer portions, the first inner portion and the plurality of first outer portions defining a plurality of first cavities, wherein the plurality of first outer portions are secured to the first inner portions via a plurality of bridges. Each of the plurality of second disc-shaped laminates includes a second inner portion and a plurality of second outer portions, the second inner portion and the plurality of second outer portions defining a plurality of second cavities, wherein the plurality of second outer portions are secured to the second inner portions via a plurality of second webs and absent a bridge.

Another aspect of the disclosure may include the plurality of first disc-shaped laminates being aligned with the plurality of second disc-shaped laminates such that the plurality of first cavities are aligned with the plurality of second cavities to form a plurality of axially-disposed cavities, wherein the plurality of axially disposed cavities define a plurality of magnetic pole sections that are radially-disposed.

Another aspect of the disclosure may include the plurality of permanent magnets being disposed in the plurality of axially-disposed cavities.

Another aspect of the disclosure may include the plurality of axially-disposed cavities defining a plurality of prisms that are arranged in a single-V arrangement for each of the plurality of magnetic pole sections.

Another aspect of the disclosure may include the plurality of axially-disposed cavities defining a plurality of prisms that are arranged in a double-V arrangement for each of the plurality of magnetic pole sections.

Another aspect of the disclosure may include the plurality of axially-disposed cavities defining a plurality of prisms that are arranged in a U arrangement for each of the plurality of magnetic pole sections.

Another aspect of the disclosure may include the wrap being arranged to encapsulate an outer peripheral surface of the rotor assembly that is defined by the plurality of first disc-shaped laminates and the plurality of second disc-shaped laminates.

Another aspect of the disclosure may include the wrap being a carbon fiber fabric that encapsulates the outer peripheral surface of the rotor assembly.

Another aspect of the disclosure may include the plurality of first disc-shaped laminates and the plurality of second disc-shaped laminates being arranged in the stack on the rotor shaft include a first of the plurality of first disc-shaped laminates being disposed on a first end of the stack, and a second of the plurality of first disc-shaped laminates being disposed on a second end of the stack.

Another aspect of the disclosure may include a third of the plurality of first disc-shaped laminates being disposed in a middle portion of the stack.

Another aspect of the disclosure may include a permanent magnet rotor assembly for an electric machine that includes a plurality of first disc-shaped laminates, a plurality of second disc-shaped laminates; and a rotor shaft. The plurality of first disc-shaped laminates and the plurality of second disc-shaped laminates are arranged in an interleaved stack on the rotor shaft, wherein each of the plurality of first disc-shaped laminates includes a first inner portion and a plurality of first outer portions, and the first inner portion and the plurality of first outer portions defining a plurality of first cavities. The plurality of first outer portions are secured to the first inner portions via a first web element and a plurality of bridges. Each of the plurality of second disc-shaped laminates includes a second inner portion and a plurality of second outer portions, the second inner portion and the plurality of second outer portions defining a plurality of second cavities, wherein the plurality of second outer portions are secured to the second inner portions via a plurality of second webs and are absent a bridge.

Another aspect of the disclosure may include the plurality of first disc-shaped laminates being aligned with the plurality of second disc-shaped laminates such that the plurality of first cavities are aligned with the plurality of second cavities to form a plurality of axially-disposed cavities, wherein the plurality of axially disposed cavities define a plurality of magnetic pole sections that are radially-disposed.

Another aspect of the disclosure may include an electrified drivetrain for a vehicle, including a DC power source, a multi-phase power inverter, a multi-phase rotary electric machine, and a torque actuator, wherein the multi-phase rotary electric machine includes a rotor assembly and a stator. The rotor assembly includes a plurality of first disc-shaped laminates, a plurality of second disc-shaped laminates, and a rotor shaft. The plurality of first disc-shaped laminates and the plurality of second disc-shaped laminates are arranged in a stack on the rotor shaft, wherein each of the plurality of first disc-shaped laminates includes a first inner portion and a plurality of first outer portions, the first inner portion and the plurality of first outer portions defining a plurality of first cavities, and the plurality of first outer portions are secured to the first inner portions via a first web and a plurality of bridges. Each of the plurality of second disc-shaped laminates includes a second inner portion and a plurality of second outer portions, the second inner portion and the plurality of second outer portions defining a plurality of second cavities, wherein the plurality of second outer portions are secured to the second inner portions via a plurality of second webs and absent a bridge.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

Figure 1:
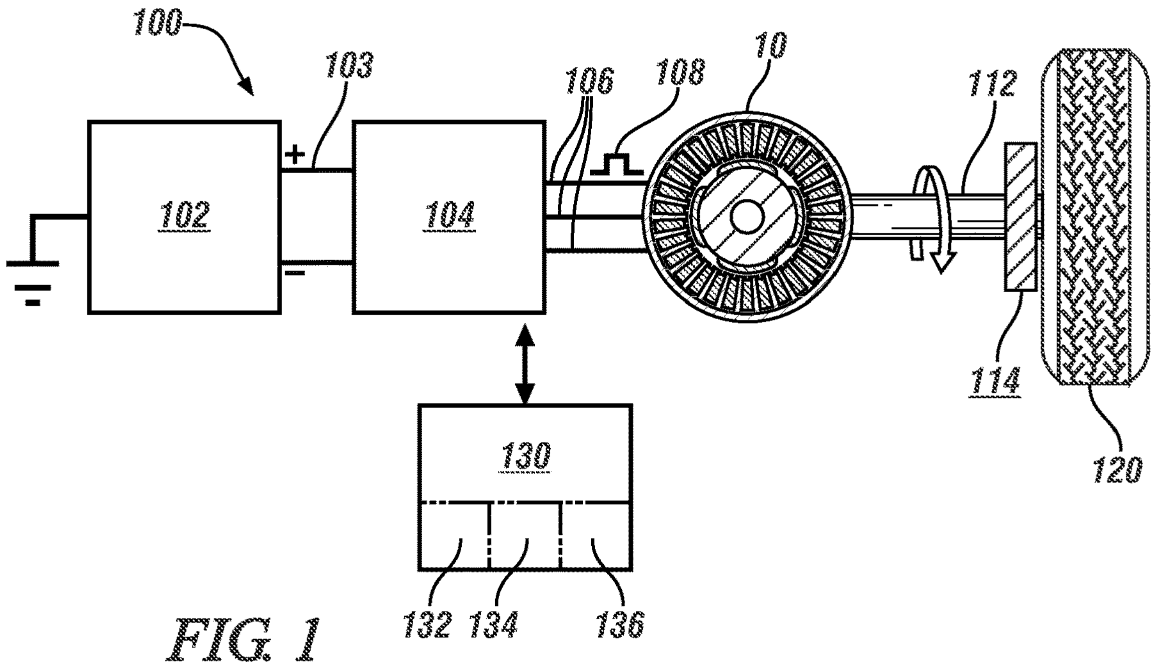
FIG. 1 is a schematic illustration of a system including a multi-phase, multi-pole permanent magnet motor/generator, a DC power source, an inverter, and a controller, in accordance with the present disclosure.

The appended drawings are not necessarily to scale, and present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments may be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

The present disclosure is susceptible of embodiment in many different forms. Representative examples of the disclosure are shown in the drawings and described herein in detail as non-limiting examples of the disclosed principles. To that end, elements and limitations described herein, but not explicitly set forth in the claims, are not to be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

As used herein, the term "system" refers to mechanical and electrical hardware, software, firmware, electronic control componentry, processing logic, and/or processor device, individually or in combination, including without limitation: application specific integrated circuit (ASIC), an electronic circuit, a processor (shared, dedicated, or group) that executes one or more software or firmware programs, memory device(s) that electrically store software or firmware instructions, a combinatorial logic circuit, and/or other components that provide the described functionality.

As employed herein, terms such as "vertical", "horizontal", "left", "right", "upper", "lower", "top", "bottom" and similar expressions are non-limiting terms that merely describe the various elements as illustrated in the Figures, and are not intended to limit the scope of the disclosure.

As used herein, the term "electric machine" refers to an electric motor/generator device including a rotor and a stator that is capable of converting electric power to mechanical power and/or converting mechanical power to electric power by electromagnetic effort.

Figure 2:
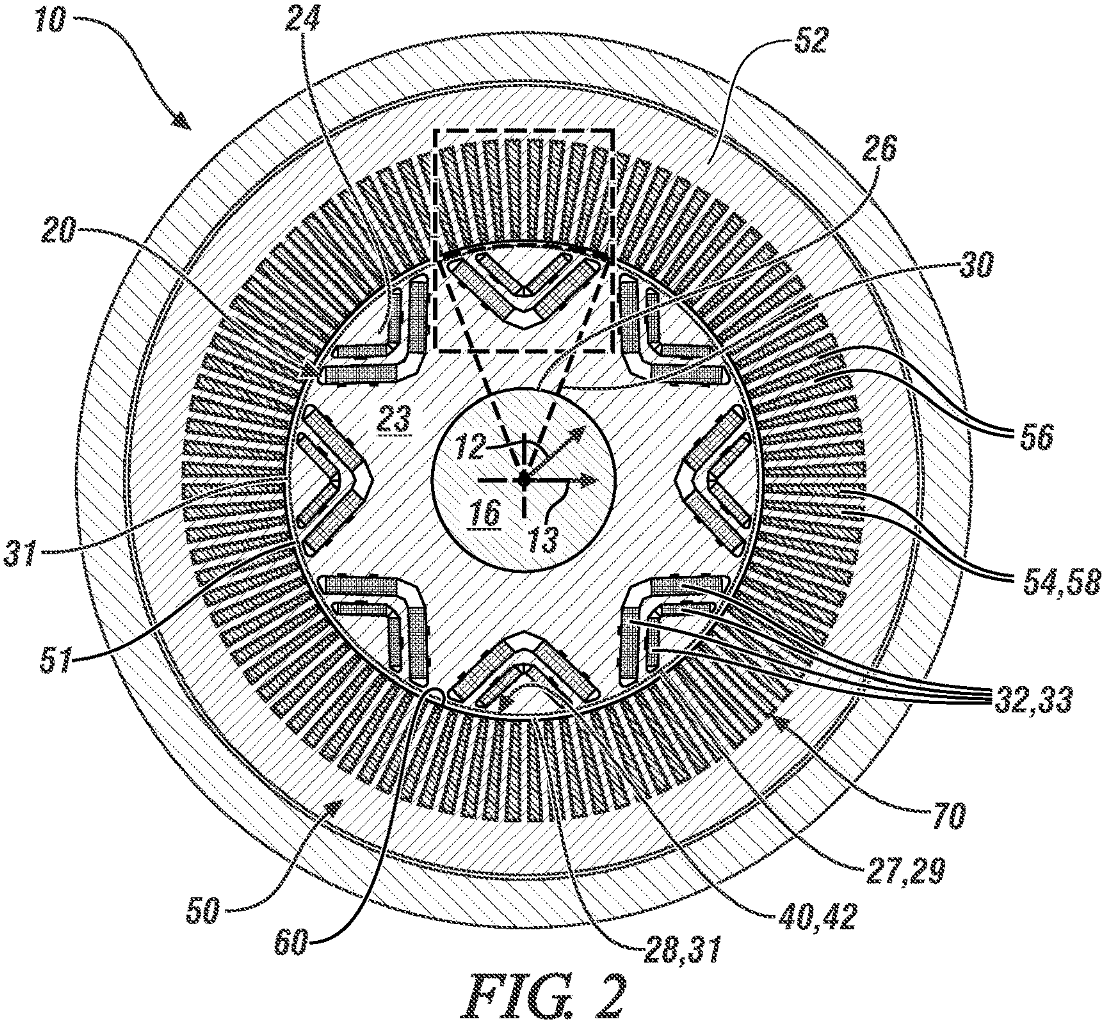
FIG. 2 is a schematic illustration of a cut-away end view of an embodiment of an interior permanent magnet (IPM) electric machine, in accordance with the disclosure.

Referring to the drawings, wherein like reference numbers refer to the same or like components in the several Figures, FIGS. 1 and 2 schematically illustrate elements of an electrified drivetrain 100 that is composed of a DC power source 102, a multi-phase power inverter 104, a multi-phase rotary electric motor/generator (electric machine) 10, and a torque actuator 120, the operations of which are monitored and controlled by a controller 130. In one embodiment, the electrified drivetrain 100 is arranged to generate and transfer torque to torque actuator 120, which may be in the form of one or multiple drive wheels to effect work, e.g., propulsion, when employed on a vehicle. Controller 130 executes control routines to control and manage operation of the multi-phase power inverter 104. In one embodiment, the electrified drivetrain 100 is disposed on a vehicle, and capable of generating tractive torque for vehicle propulsion. When disposed on vehicle, the vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Non-limiting examples of vehicles that employ electrified drivetrains 100 include electric vehicles (EVs) and various hybrid-electric vehicles (HEVs). Alternatively, the electrified drivetrain 100 may be an element of a stationary system.

The controller 130 may be embodied as one or more digital computing devices, and may include one or more processors 134 and memory 132. A control routine 136 may be stored as an executable instruction set in the memory 132 and executed by one of the processors 134 of the controller 130. The controller 130 is in communication with the multi-phase power inverter 104 to control operation thereof in response to execution of the control routine 136 to operate the electric machine 10.

The term "controller" and related terms such as micro-controller, control module, module, control, control unit, processor and similar terms refer to one or multiple combinations of Application Specific Integrated Circuit(s) (ASIC), Field-Programmable Gate Array (FPGA), electronic circuit(s), central processing unit(s), e.g., microprocessor(s) and associated memory component(s) in the form of transitory and/or non-transitory memory component(s) and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that may be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables.

The electric machine 10 includes a cylindrically-shaped rotor assembly 20 arranged on a rotor shaft 16 and disposed within an annularly-shaped stator 50, wherein the rotor assembly 20 is coaxial with a rotor opening that is formed in the stator 50. Other elements of the electric machine 10, e.g., end caps, shaft bearings, electrical connections, etc., are included but not shown. Electrical windings of the stator 50 are arranged with a quantity of electrical phases and a quantity of electrical turns per phase. Depending on the specific arrangement, the quantity of electrical phases may be between 3 and 6, and the quantity of layers of conductors may be between 4 and 12.

The multi-phase power inverter 104 includes a plurality of semiconductor switches that are arranged and controllable to transform DC electric power to AC electric power, and transform AC electric power to DC electric power, employing a pulse-width modulation signal 108 or another control technique. The multi-phase power inverter 104 is arranged and is controllable to transform DC electric power originating from the DC power source 102 to AC electric power to actuate the electric machine 10 via electromagnetic effort. The electric machine 10 is controllable to rotate and generate mechanical torque that is transferred via a rotatable member 112 and a geartrain 114 to the torque actuator 120 when operating in a torque generating mode. The electric machine 10 is controllable to generate AC electric power from mechanical torque originating at the torque actuator 120 via electromagnetic effort, which is transformed by the multi-phase power inverter 104 to DC electric power for storage in the DC power source 102 when operating in an electric power generating mode. The torque actuator 120 includes, in one embodiment, a vehicle wheel that transfers torque to a ground surface to effect forward motion as part of a traction propulsion system.

The DC power source 102 may be a rechargeable electrochemical battery device, a fuel cell, an ultracapacitor, and/or another electrical energy storage/generation technology. The DC power source 102 connects to the multi-phase power inverter 104 via a high-voltage DC bus 103, and the multi-phase power inverter 104 connects to the electric machine 10 via a plurality of electrical power lines 106.

FIG. 2 schematically illustrates an embodiment of the electric machine 10, which is an interior permanent magnet (IPM) device in one embodiment. The IPM electric machine 10 includes a cylindrically-shaped rotor assembly 20 arranged on a rotor shaft 16 and disposed within an annularly-shaped stator 50, wherein the rotor assembly 20 is coaxial with a rotor opening 60 that is formed in the stator 50. Other elements of the IPM electric machine 10, e.g., end caps, shaft bearings, electrical connections, etc., are included but not shown. The IPM electric machine 10 is illustrated in context of a radial axis 13 and a longitudinal axis 12, wherein the longitudinal axis 12 is defined by the rotor shaft 16.

The rotor assembly 20 includes a plurality of first disc-shaped laminates 21 interleaved with a plurality of second disc-shaped laminates 22 and arranged in a stack. As described in additional detail with reference to FIGS. 3, et seq., each of the first and second disc-shaped laminates 21, 22 includes an inner portion 23 and an outer portion 24, which define and circumscribe a plurality of cavities 32 that accommodate and house a plurality of permanent magnets 33. The first disc-shaped laminates 21 are interleaved with the second disc-shaped laminates 22, and are assembled onto the rotor shaft 16 and encased in an annular sleeve or wrap 40. Each of the first disc-shaped laminates 21 and the second disc-shaped laminates 22 is a stamped sheet that is formed from a ferrous material and is fabricated using a stamping process. Each of the first disc-shaped laminates 21 and the second disc-shaped laminates 22 is a disk-shaped device formed with a uniform thickness and a constant outer diameter, and has a centrally-located shaft aperture 26 and a plurality of magnetic pole sections 30 formed thereon. A single one of the magnetic pole sections 30 is indicated. Additional details related to an embodiment of the first disc-shaped laminates 21 are described with reference to FIG. 3, and additional details related to an embodiment of the second disc-shaped laminates 22 are described with reference to FIG. 4.

Referring again to FIG. 2, the magnetic pole sections 30 are repeated around an outer circumferential portion of each of the first and second disc-shaped laminates 21, 22, and define the quantity of magnetic poles of the rotor assembly 20. As shown, and by way of a non-limiting example, there are eight magnetic pole sections 30, defining a quantity of four magnetic pole pairs for rotor assembly 20. It is appreciated that there may be other quantities of the magnetic pole sections 30 in other embodiments, without limitation.

Each of the magnetic pole sections 30 includes a plurality of cavities 32, which may be disposed in a double-V arrangement (as shown), or another arrangement. Other examples of arrangements of the magnetic pole sections 30 and the plurality of cavities 32 may include, by way of non-limiting examples, the plurality of cavities 32 being disposed in a single-V arrangement, a U arrangement, or another arrangement.

The plurality of first and second disc-shaped laminates 21, 22 are assembled with the rotor shaft 16 being inserted into the shaft apertures 26 such that the magnetic pole sections 30 are concentrically aligned to define and form a plurality of cavities 32 that are parallel to the longitudinal axis 12 defined by the rotor shaft 16. The plurality of cavities 32 accommodate and house a respective plurality of permanent magnets 33, which are prismatic-shaped elements having rectangular, trapezoidal, dovetailed, or other cross-sectional shapes. Additional details related to the plurality of cavities 32, and the permanent magnets 33 are described in greater detail with reference to FIGS. 3 and 4.

The permanent magnets 33 may be fabricated from rare-earth materials, and may be described in terms of a longitudinal axis and a rectangular cross-sectional area having a major axis and a minor axis. A rare-earth magnet is formed from alloys of rare-earth materials, such as dysprosium-reduced material or another suitable material. Other rare-earth materials may include neodymium and samarium. Alternatively, the permanent magnets 33 may be fabricated from non-rare earth materials such as ferrite, Alnico (aluminum-nickel-cobalt), FeCo (iron-cobalt), MnBi (manganese-bismuth), etc., or combinations thereof.

The annular wrap 40 is fabricated from carbon fiber or another material, and encapsulates an outer peripheral surface 27 of the rotor assembly 20. By way of non-limiting examples, the annular wrap 40 may instead be fabricated from stainless steel, glass fiber, titanium alloy, etc. The annular wrap 40 is arranged to provide retention force that counteracts the centrifugal force associated with rotation of the rotor assembly 20.

External dimensions associated with the rotor assembly 20 include an outer diameter 29. The outer diameter 29 is associated with the outer peripheral surface 27 of the rotor assembly 20 and the annular wrap 40, and is measured in relation to the radial axis 13.

The stator 50 includes, in one embodiment, a plurality of stamped, ferrous disc-shaped laminates 52 arranged in a stack. Each of the disc-shaped laminates 52 is a disk-shaped device formed having a uniform thickness, and each defines a centrally-located inner aperture 51 that is formed to dimensionally accommodate the outer diameter 29 of the rotor assembly 20 including the annular wrap 40. Each of the disc-shaped laminates 52 also includes a plurality of radially-oriented, inwardly-projecting teeth 56. The disc-shaped laminates 52 are arranged in a stack such that the inner apertures 51 are aligned and the inwardly-projecting teeth 56 are aligned. The disc-shaped laminates 52 are assembled into a unitary device. Rotor opening 60 is formed by the concentrically aligned inner apertures 51 of the plurality of disc-shaped laminates 52, and a plurality of longitudinally-oriented slots 58 are formed between the aligned inwardly-projecting teeth 56 of the plurality of disc-shaped laminates 52.

The slots 58 are configured to accommodate electrical windings 54 that are arranged in a distributed electrical winding assembly 70 that is fabricated with stranded conductive wire in one embodiment. The stranded conductive wire may be fabricated from suitable material, e.g., copper or aluminum. Internal dimensions associated with the stator 50 include an inner diameter, which defines an inner peripheral surface 28 of the stator 50. Alternatively, the electrical windings 54 may be arranged in a concentrated winding configuration.

An air gap 31 is formed between an outer peripheral surface 42 of the rotor assembly 20 (including annular wrap 40) and the inner peripheral surface 28 of the stator 50.

The distributed electrical winding assembly 70 of the electrical windings 54 in the stator 50 are preferably arranged to provide a revolving electrical field arrangement that provides a rotating magnetic field in the stator 50 by applying a polyphase alternating current, which may be supplied by an integrated power inverter, e.g., inverter 104. In one embodiment, the polyphase alternating current is a three-phase alternating current. During operation, electromagnetic forces that are induced in the electrical windings 54 introduce magnetic flux that acts upon the permanent magnets 33 embedded in the rotor assembly 20, thus exerting a torque to cause the rotor assembly 20 to rotate about the rotor shaft 16 within the stator 50. Alternating current (AC) motors may be divided generally into AC induction motors and AC synchronous motors. In a revolving field type of AC synchronous motor in which a stator is provided with armature windings and a rotor assembly is provided with magnet windings, the rotor assembly is changed to an electromagnet by excitation of the magnet windings of the rotor assembly, and the rotor assembly rotates by applying a polyphase alternating current to the stator. In applications wherein the electric power originates from DC power source 102, the polyphase alternating current is generated by the power inverter 104.

The electrical windings of the stator 50 are arranged with a quantity of electrical phases and a quantity of electrical turns per phase. Depending on the specific arrangement, the quantity of electrical phases may be between 3 and 6, and the quantity of layers of conductors may be between 4 and 12.

Specific geometric design parameters associated with the rotor assembly 20 and the stator 50 of the IPM electric machine 10 are identified, including a first set of geometric design parameters associated with the rotor assembly 20 and a second set of geometric design parameters associated with the stator 50. Ranges for the first and second sets of geometric design parameters are selected to achieve motor operating parameters that include a high drive-cycle efficiency, e.g., greater than 90% peak efficiency over a wide operational area, a high torque density, a wide peak power range, a maximum speed of 21,000 rpm or greater.

Figure 3:
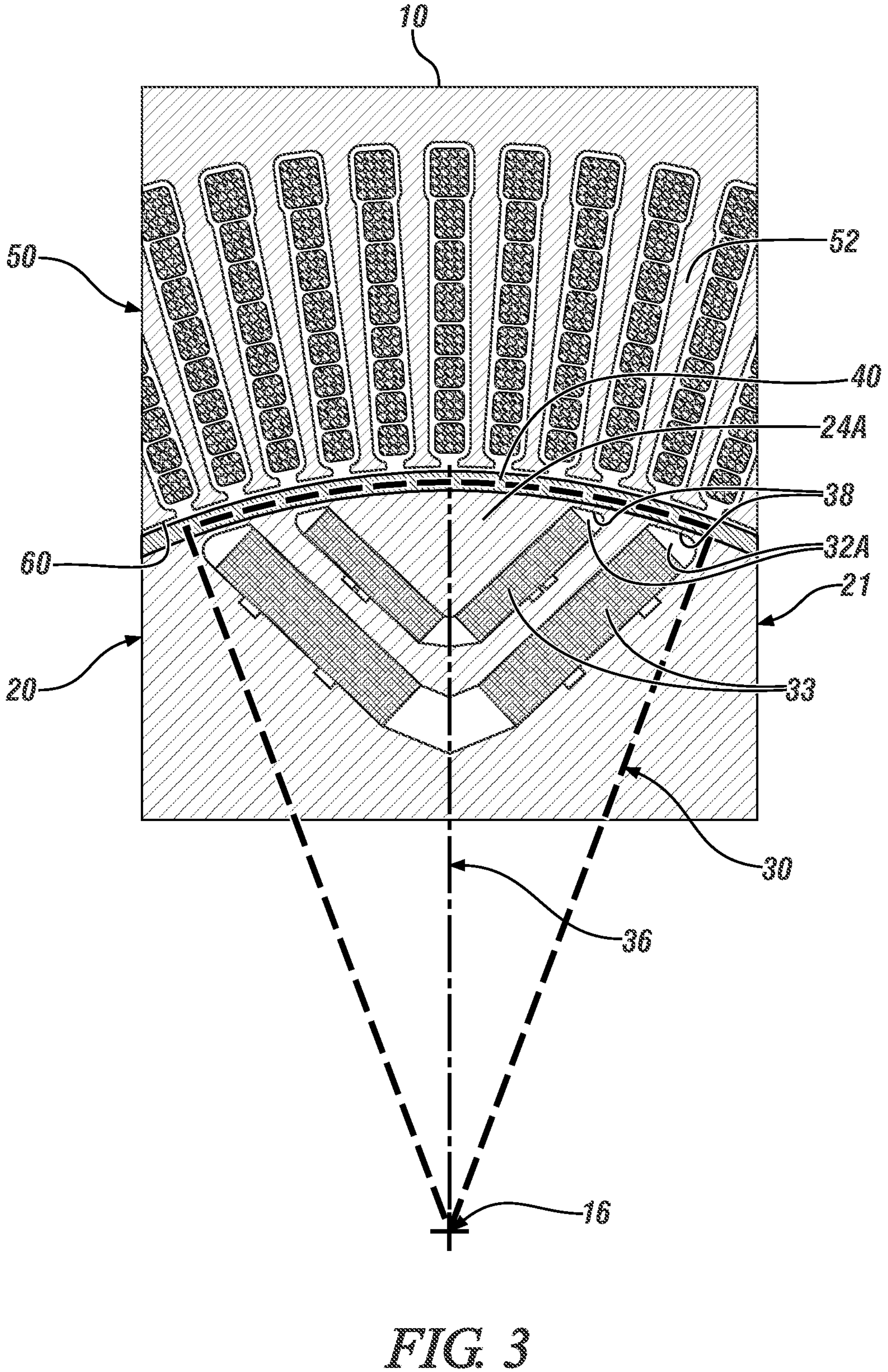
FIG. 3 is a schematic illustration of a cut-away end view of a portion of a first laminate of a rotor assembly and stator of an IPM electric machine, in accordance with the disclosure.

FIG. 3 schematically illustrates a first cutaway end view of portion of the electric machine 10 including cylindrically-shaped rotor assembly 20 and stator 50, wherein the rotor assembly 20 is coaxial with the rotor opening 60 that is formed in the stator 50. A single magnetic pole section 30 of one of the first disc-shaped laminates 21 of the rotor assembly 20 is shown. In this embodiment, the magnetic pole section 30 of the first disc-shaped laminate 21 is formed by a plurality of first cavities 32A that are arranged in a double-V pattern and are disposed in a nested V arrangement that is mirrored around the radial line 36. The plurality of first cavities 32A contain a corresponding plurality of the permanent magnets 33. The permanent magnets 33 are prismatic-shaped elements having major axes that run parallel to a longitudinal axis of the rotor shaft 16. In this embodiment, the first disc-shaped laminate 21 includes an inner portion 23 and first outer portion 24A, which define and circumscribe the plurality of first cavities 32A. The inner portion 23 is joined to the first outer portion 24A via bridges 38 that are formed on the outer peripheral surface 27 of the rotor assembly 20. In one embodiment, there is a web formed in the first laminate 21 along the radial line 36 between adjacent ones of the first cavities 32A. Alternatively and as illustrated, there are no webs formed between adjacent ones of the first cavities 32A.

Figure 4:
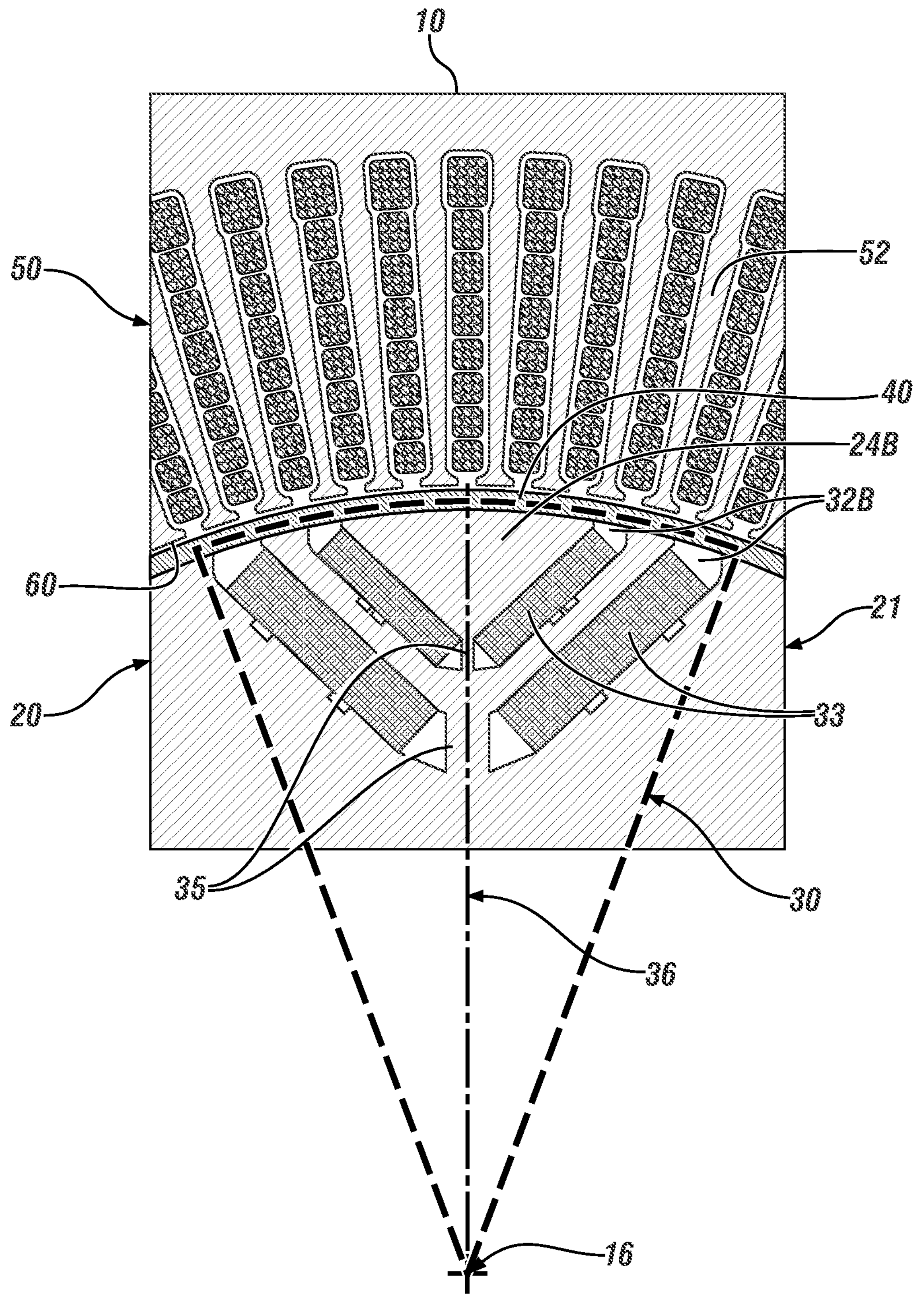
FIG. 4 is a schematic illustration of a cut-away end view of a portion of a second laminate of a rotor assembly and stator of an IPM electric machine, in accordance with the disclosure.

FIG. 4 schematically illustrates a second cutaway end view of portion of the electric machine 10 including cylindrically-shaped rotor assembly 20 and stator 50, wherein the rotor assembly 20 is coaxial with the rotor opening 60 that is formed in the stator 50. A single magnetic pole section 30 of one of the second disc-shaped laminates 22 of the rotor assembly 20 is shown. In this embodiment, the magnetic pole section 30 of the second disc-shaped laminate 22 is formed by a plurality of second cavities 32B that are arranged in a double-V pattern and are disposed in a nested V arrangement that is mirrored around the radial line 36. The plurality of second cavities 32B contain a corresponding plurality of the permanent magnets 33. The permanent magnets 33 are prismatic-shaped elements having major axes that run parallel to a longitudinal axis of the rotor shaft 16. In this embodiment, the second disc-shaped laminate 22 includes inner portion 23 and second outer portion 24B, which define and circumscribe the plurality of second cavities 32B. The inner portion 23 is joined to the second outer portion 24B only via webs 35 that are formed along the radial line 36. No bridges are formed between the inner portion 23 and the second outer portion 24B. As such, the second outer portion 24B is secured in a cantilevered position to the inner portion 23 when the second disc-shaped laminate 22 is in an unassembled state.

Figure 5:
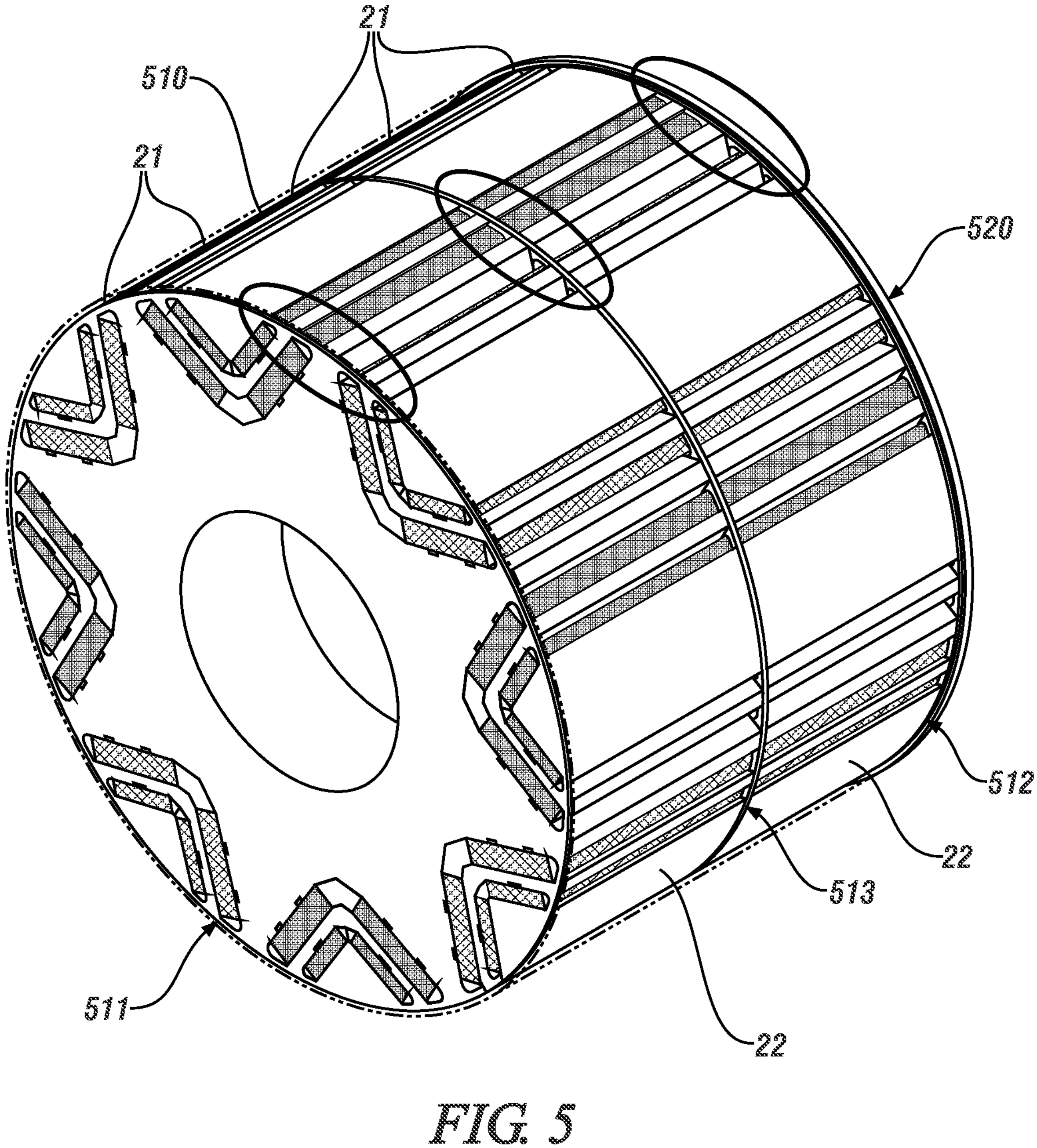
FIG. 5 is a schematic illustration of an isometric view of an embodiment of a rotor assembly, in accordance with the disclosure.

FIG. 5 illustrates an embodiment of a portion the rotor assembly 520, which is composed as a plurality of the first disc-shaped laminates 21 and a plurality of the second disc-shaped laminates 22. The plurality of first disc-shaped laminates 21 and the plurality of second disc-shaped laminates 22 are interleaved and arranged in a stack 510 as described herein. In this embodiment, a first of the plurality of first disc-shaped laminates 22 is disposed on a first end 511 of the stack 510, and a second of the plurality of first disc-shaped laminates 21 is disposed on a second end 512 of the stack. In one embodiment, a third of the plurality of first disc-shaped laminates 21 is disposed in a middle portion 513 of the stack 510. The remaining portions of the stack 510 are populated by the plurality of the second disc-shaped laminates 22. The second outer portions 24B of the second disc-shaped laminates 22 are secured to the inner portion 23 by the wrap 40 when the rotor assembly 20 is assembled. Furthermore, the second outer portions 24B of the disc-shaped laminates 22 are secured to the inner portions 23 because the plurality of first and second disc-shaped laminates 21, 22 are welded or otherwise bonded together in the axial direction during assembly.

Figure 6:
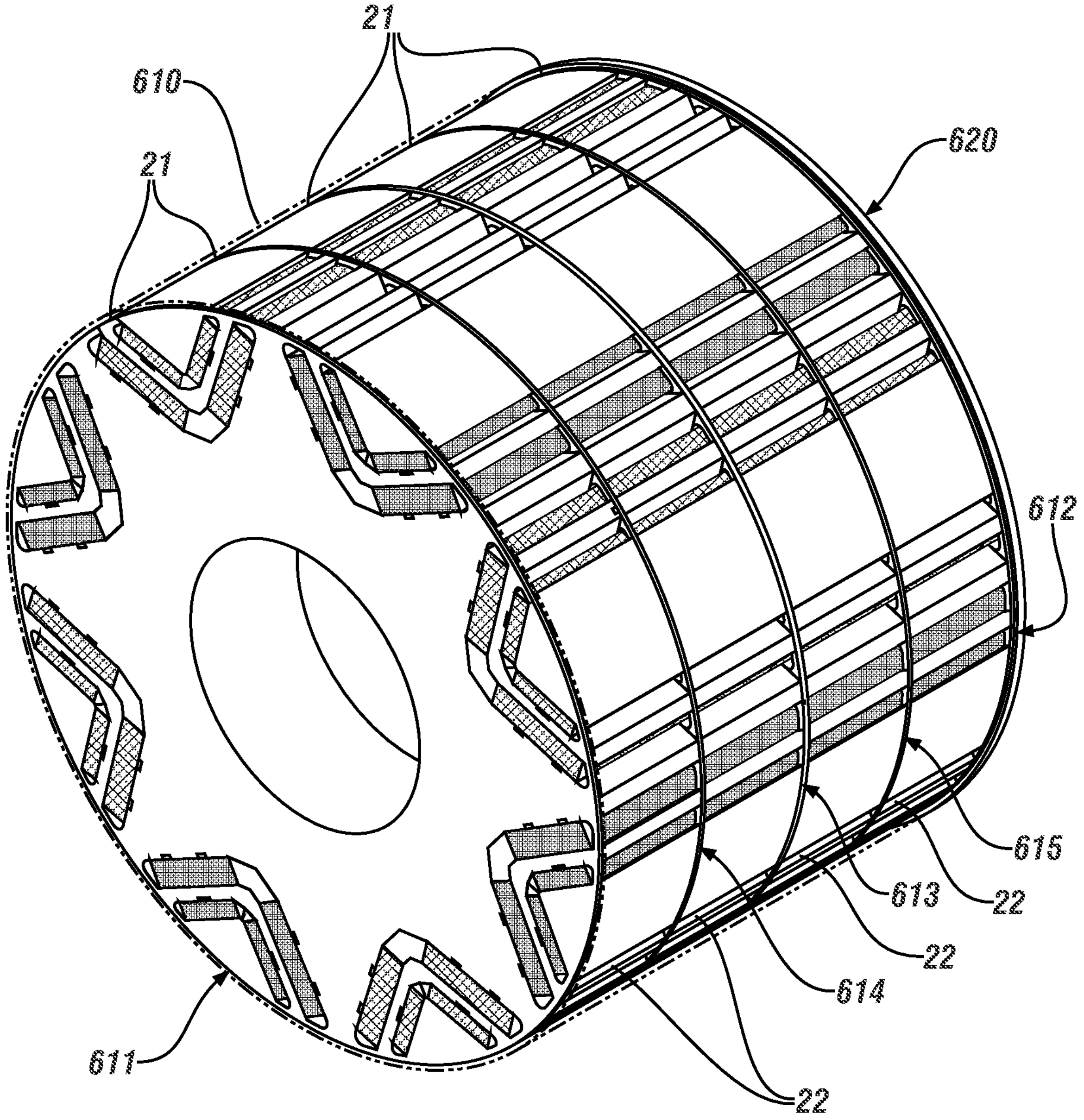
FIG. 6 is a schematic illustration of an isometric view of another embodiment of a rotor assembly, in accordance with the disclosure.

FIG. 6 illustrates another embodiment of a portion the rotor assembly 620, which is composed as a plurality of the first disc-shaped laminates 21 and a plurality of the second disc-shaped laminates 22. The plurality of first disc-shaped laminates 21 and the plurality of second disc-shaped laminates 22 are interleaved and arranged in a stack 610 as described herein. In this embodiment, a first of the plurality of first disc-shaped laminates 22 is disposed on a first end 611 of the stack 510, and a second of the plurality of first disc-shaped laminates 21 is disposed on a second end 612 of the stack. In one embodiment, a third of the plurality of first disc-shaped laminates 21 is disposed in a middle portion 613 of the stack 610, a fourth of the plurality of first disc-shaped laminates 21 is disposed at a first quarter portion 614 of the stack 610, and a fifth of the plurality of first disc-shaped laminates 21 is disposed at a third quarter portion 615 of the stack 610. The remaining portions of the stack 610 are populated by the plurality of the second disc-shaped laminates 22. The absence of bridges at the ends of the second cavities 32B that contain the permanent magnets 33 means that there is less likelihood of flux leakage thereat. Again, the second outer portions 24B of the second disc-shaped laminates 22 are secured to the inner portion 23 by the wrap 40 when the rotor assembly 20 is assembled. Furthermore, the second outer portions 24B of the disc-shaped laminates 22 are secured to the inner portions 23 because the plurality of first and second disc-shaped laminates 21, 22 are welded or otherwise bonded together in the axial direction during assembly.

The concepts described herein provide an IPM electric machine including a rotor assembly that is arranged with a plurality of magnetic pole sections that each includes one or multiple permanent magnets, wherein a wrap portion is arranged on an outer periphery of the rotor assembly. The embodiments described herein may provide increased torque density, increased power density, decreased flux leakage, and other benefits as compared to similarly sized electric machines that lack such arrangements. This provides a better potential to balance the cost, energy consumption, and performance by introducing design freedoms not otherwise available.

Embodiments of the electric machine described herein are configured to optimize operating parameters related to torque, speed, power, efficiency, packaging, mass, and other constraints.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An electric machine comprising:

a plurality of first disc-shaped laminates, a plurality of second disc-shaped laminates; a rotor shaft; a stator, a wrap; and a plurality of permanent magnets;

wherein the plurality of first disc-shaped laminates and the plurality of second disc-shaped laminates are arranged in a stack on the rotor shaft;

wherein the wrap is annular and arranged to encapsulate an outer surface of the rotor assembly defined by the plurality of first disc-shaped laminates and the plurality of second disc-shaped laminates;

wherein the wrap does not cover respective ends of the stack;

wherein an air gap is formed between the wrap and an inner peripheral surface of the stator;

wherein each of the plurality of first disc-shaped laminates includes first inner portions and a plurality of first outer portions, the first inner portions and the plurality of first outer portions defining a plurality of first cavities;

wherein the plurality of first outer portions are secured to the first inner portions via a first web and a plurality of bridges;

wherein each of the plurality of second disc-shaped laminates includes second inner portions and a plurality of second outer portions, the second inner portions and the plurality of second outer portions defining a plurality of second cavities;

wherein the plurality of second outer portions are secured to the second inner portions via a plurality of second webs, the plurality of second outer portions being absent a bridge;

wherein a first of the plurality of first disc-shaped laminates is disposed at a first end of the stack, a second of the plurality of first disc-shaped laminates is disposed at a second end of the stack, and a third of the plurality of first disc-shaped laminates is disposed at a middle portion of the stack; and wherein a fourth of the plurality of first disc-shaped laminates is disposed at a first quarter portion of the stack, a fifth of the plurality of first disc-shaped laminates is disposed at a third quarter portion of the stack, and remaining portions of the stack are populated by the plurality of second disc-shaped laminates.

2. The electric machine of claim 1, wherein the plurality of first disc-shaped laminates are aligned with the plurality of second disc-shaped laminates such that the plurality of first cavities are aligned with the plurality of second cavities to form a plurality of axially-disposed cavities; and wherein the plurality of axially-disposed cavities define a plurality of magnetic pole sections that are radially-disposed.

3. The electric machine of claim 2, wherein the plurality of permanent magnets are disposed in the plurality of axially-disposed cavities.

4. The electric machine of claim 2, wherein the plurality of axially-disposed cavities define a plurality of prisms that are arranged in a single-V arrangement for each of the plurality of magnetic pole sections.

5. The electric machine of claim 2, wherein the plurality of axially-disposed cavities define a plurality of prisms that are arranged in a double-V arrangement for each of the plurality of magnetic pole sections.

6. The electric machine of claim 2, wherein the plurality of axially-disposed cavities define a plurality of prisms that are arranged in a U arrangement for each of the plurality of magnetic pole sections.

7. The electric machine of claim 1, wherein the wrap comprises a carbon fiber fabric.

8. An electrified drivetrain for a vehicle, comprising:

a DC power source, a multi-phase power inverter, a multi-phase rotary electric machine, and a torque actuator;

wherein the multi-phase rotary electric machine includes a rotor assembly and a stator;

wherein the rotor assembly includes a plurality of first disc-shaped laminates, a plurality of second disc-shaped laminates, a wrap; and a rotor shaft;

wherein the plurality of first disc-shaped laminates and the plurality of second disc-shaped laminates are arranged in a stack on the rotor shaft;

wherein the wrap is annular and arranged to encapsulate an outer surface of the rotor assembly defined by the plurality of first disc-shaped laminates and the plurality of second disc-shaped laminates;

wherein the wrap does not cover respective ends of the stack;

wherein an air gap is formed between the wrap and an inner peripheral surface of the stator;

wherein each of the plurality of first disc-shaped laminates includes first inner portions and a plurality of first outer portions, the first inner portions and the plurality of first outer portions defining a plurality of first cavities;

wherein the plurality of first outer portions are secured to the first inner portions via a first web and a plurality of bridges;

wherein each of the plurality of second disc-shaped laminates includes second inner portions and a plurality of second outer portions, the second inner portions and the plurality of second outer portions defining a plurality of second cavities;

wherein the plurality of second outer portions are secured to the second inner portions via a plurality of second webs and are absent a bridge;

wherein a first of the plurality of first disc-shaped laminates is disposed at a first end of the stack, a second of the plurality of first disc-shaped laminates is disposed at a second end of the stack, and a third of the plurality of first disc-shaped laminates is disposed at a middle portion of the stack; and wherein a fourth of the plurality of first disc-shaped laminates is disposed at a first quarter portion of the stack, a fifth of the plurality of first disc-shaped laminates is disposed at a third quarter portion of the stack, and remaining portions of the stack are populated by the plurality of second disc-shaped laminates.

9. The electric machine of claim 1, wherein the wrap is comprised of stainless steel or glass fiber.

10. The electrified drivetrain of claim 8, wherein the wrap is comprised of stainless steel or glass fiber.

* * * * *